United States Patent [19]

Bender

[11] Patent Number: 4,989,496
[45] Date of Patent: Feb. 5, 1991

[54] VACUUM SUPPLY SYSTEM WITH THROTTLING VALVE IN A MOTOR VEHICLE

[75] Inventor: Franz Bender, Wendlingen, Fed. Rep. of Germany

[73] Assignee: Daimler-Benz AG, Fed. Rep. of Germany

[21] Appl. No.: 317,916

[22] Filed: Mar. 1, 1989

[30] Foreign Application Priority Data

Mar. 3, 1988 [DE] Fed. Rep. of Germany ....... 3806916

[51] Int. Cl.$^5$ .............................................. F15B 11/00
[52] U.S. Cl. ...................................... 91/516; 91/532; 91/443; 60/397; 60/412; 137/510; 137/907; 303/12
[58] Field of Search ..................... 180/244; 303/12, 4; 91/514, 516, 532, 443; 60/397, 407, 412; 137/907, 510, 513.3

[56] References Cited

U.S. PATENT DOCUMENTS

| | | |
|---|---|---|
| 2,601,757 | 7/1952 | Horton . |
| 2,732,685 | 1/1956 | Oishei ................... 303/12 |
| 2,998,256 | 8/1961 | Lipkins ................. 137/510 |
| 3,606,871 | 9/1981 | Gropp et al. ........... 137/513.7 X |
| 4,129,622 | 12/1978 | Tamazawa et al. ...... 137/513.3 X |
| 4,303,095 | 12/1981 | Aubel et al. ........... 137/907 X |
| 4,310,016 | 1/1982 | Aubel .................. 137/907 X |
| 4,373,499 | 2/1983 | Bendig ................. 137/110 X |
| 4,391,294 | 7/1983 | Aubel .................. 137/510 X |
| 4,485,904 | 12/1984 | Udono et al. .......... 137/513.7 X |
| 4,531,624 | 7/1985 | Ideta .................. 60/397 X |
| 4,554,786 | 11/1985 | Takeuchi et al. ....... 60/397 |
| 4,592,385 | 6/1986 | Semon ................. 137/510 X |
| 4,617,953 | 10/1986 | Kendall-Tobias ........ 137/110 |

FOREIGN PATENT DOCUMENTS

| | | |
|---|---|---|
| 1120293 | 12/1961 | Fed. Rep. of Germany . |
| 2814384 | 10/1979 | Fed. Rep. of Germany . |
| 3011360 | 10/1981 | Fed. Rep. of Germany . |
| 3124153 | 3/1982 | Fed. Rep. of Germany . |
| 3105041 | 9/1982 | Fed. Rep. of Germany . |
| 3243984 | 6/1983 | Fed. Rep. of Germany . |
| 3526763 | 2/1987 | Fed. Rep. of Germany . |

Primary Examiner—Edward K. Look
Assistant Examiner—John Ryznic
Attorney, Agent, or Firm—Evenson, Wands, Edwards, Lenahan & McKeown

[57] ABSTRACT

A vacuum supply system for a brake power assist unit of a motor vehicle with at least one additional vacuum consuming device is achieved by the installation of a valve, which can be switched as a function of existing vacuum level in a pipe leading from the vacuum generating device to the at least one additional consuming device. Switching of the valve causes a throttling of this pipe to be more extensive when the existing vacuum level is above a certain absolute pressure value.

18 Claims, 2 Drawing Sheets

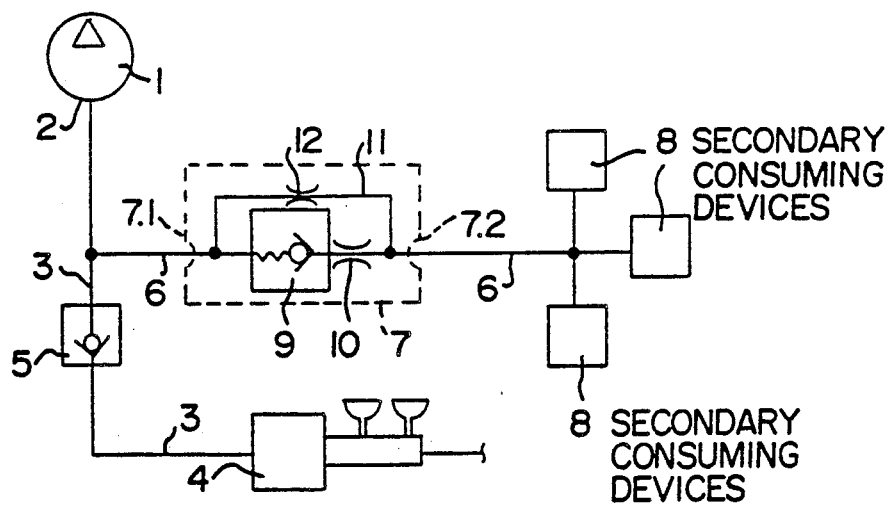
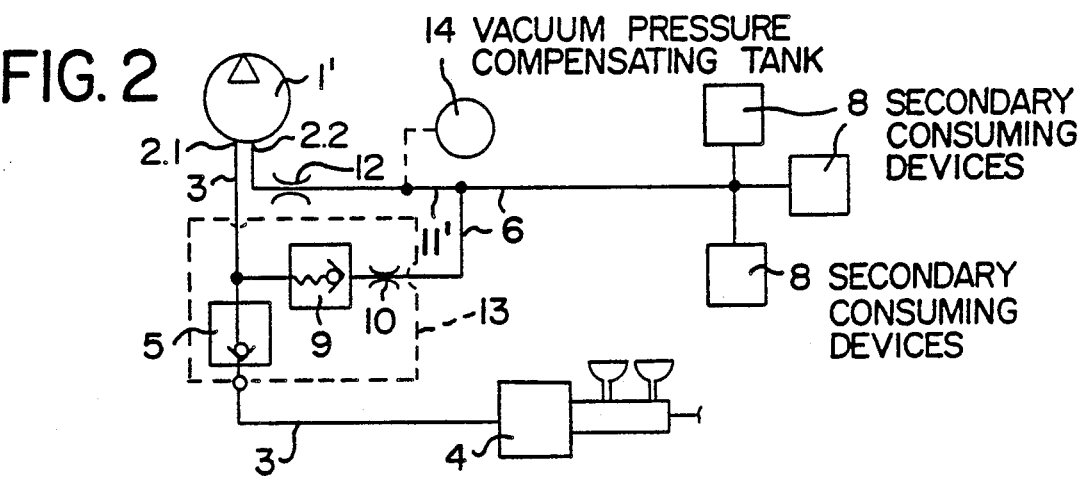
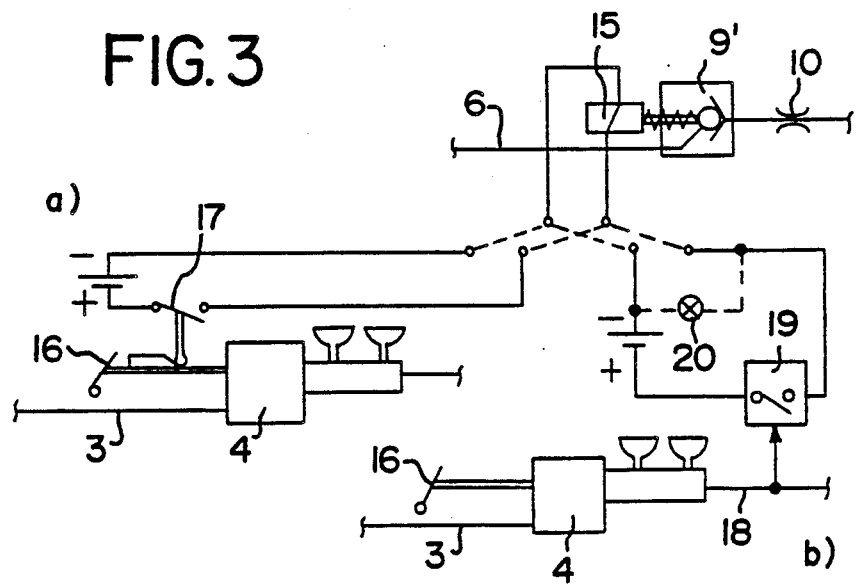

4,989,496

VACUUM SUPPLY SYSTEM WITH THROTTLING VALVE IN A MOTOR VEHICLE

BACKGROUND AND SUMMARY OF THE INVENTION

The invention relates to a vacuum supply system for a brake power assist unit of a vehicle, as well as for at least one additional consuming device and has a vacuum generating device connected to a main pipe being provided with a first check valve between a suction connection of the vacuum generating device and the brake power assist unit. A secondary pipe leads at least indirectly from the vacuum generating device to the additional consuming device and this secondary pipe contains at least one flow control device for throttling the suction flow from the secondary consuming device to the vacuum generating device, as well as a valve for controlling the suction flow.

A vacuum supply system of this type is known from German Unexamined Patent Application DE-OS 31 24 153.

Check valves between vacuum generating devices and different consuming devices, or groups of consuming devices, are normally installed in the corresponding supply pipes in order to avoid incoming atmospheric air, due to leakages at individual consuming devices, which has a disadvantageous effect on the vacuum level at other consuming devices which are not leaking.

Flow control devices such as brake power assist units which are arranged in front of secondary or so-called vacuum-consuming comfort devices (e.g., headlight adjusting motors, air-conditioning system control motors, etc.) require vacuum supply priority, which is desirable for reasons of driving safety. With a secure priority system, such priority devices can be evacuated by the same vacuum generating device as the secondary vacuum consuming devices.

It is known to use vacuum pumps with two separate suction connections (German Unexamined Patent Application DE-OS 32 43 984), in which case the suction connection belonging to the secondary consuming devices is equipped with a flow control device.

The above-mentioned arrangement is in use in diesel engine equipped vehicles manufactured by Daimler-Benz Aktiengesellschaft, in which however, a check valve is arranged in the suction pipe leading from the brake power assist unit to the vacuum source in order to maintain the vacuum level at the brake power assist unit during an atmospheric pressure flow short circuit of the vacuum pump. Between the brake power assist unit and the check valve, a throttled secondary pipe branches off from the suction pipe leading to the brake power assist unit. This throttled secondary pipe is bled only for the zero adjustment of the injection pump control rod when the diesel engine is shut off. For safety reasons, it must be a single pipe.

The growing number of comfort enhancing vacuum consuming devices used in motor vehicles make it necessary to be able to continuously ensure their vacuum supply. This supply should be improved over known systems mainly in view of the requirement that the lowest vacuum level be available at the brake power assist unit only when the power brake is actually actuated.

It is therefore the object of the invention to develop a vacuum supply system of this type, such that when the power brake is not actuated, the vacuum supply of secondary consuming devices is improved.

According to the invention, this object is achieved by having a valve that can be switched between at least two positions (I, II) as a function of the vacuum instantaneously existing in the system. The suction flow between the vacuum generating source and the consuming device(s) in position (I) of the valve is by an additional flow control device which valve is fluidly connected in series with the first flow control device, and wherein the valve in its other position (II) limits throttling only by the first control device.

By a bridging provided by the bypass, the check valve flow control device unit connected between the vacuum generating device and the secondary consuming devices, ensures that overall flow resistance of the supply of the secondary consuming devices is reduced, despite the additional flow control devices, so that when the power brake is not actuated, practically the complete vacuum output is available for use by the secondary consuming devices.

A vacuum supply system for a brake power assist unit and at least one additional consuming device is known from German Unexamined Patent Application DE-OS 31 05 041. There, the branch pipe of the secondary consuming device contains a flow control device for securing the priority of the supply of the brake power assist unit as well as a check valve, which fluidly is switched in parallel with this flow control device. Although the throttled pipe section is called a "detour pipe", it actuallY, because of the provided orientation of the parallel check valve through which an evacuation of the secondary consuming device must not be possible, represents the only bleeding possibility of the secondary consuming device. The check valve permits only an additional evacuation of the brake power assist unit at the expense of the vacuum level at the secondary consuming device.

Because of the specified opposite objectives, the mentioned German Unexamined Patent Application DE-OS 31 05 041 can supply no reference with respect to the construction of the type of vacuum supply system having a valve that can be switched between at least two positions (I, II) as a function of the vacuum instantaneously existing in the system. The suction flow between the vacuum generating source and the consuming device(s) in position (I) of the valve is by an additional flow control device which valve is fluidly connected in series with the first flow control device, and wherein the valve in its other position (II) limits throttling only by the first control device.

It is advantageous if the valve can be directly pneumatically switched within a certain vacuum value range by the vacuum existing in the system. The valve can be switched electromagnetically and in a controlled manner by an electric pressure switched responding to the vacuum existing in the system within a certain vacuum value range. The valve is constructed as a 2/2-way valve.

It is also advantageous if the valve is located in a chamber which has a suction connection path, a consuming device connecting path and an atmosphere connecting path and if both the suction connection path and the consuming device connecting path from the atmosphere connecting path are constantly separated by a diaphragm. The diaphragm can be switched within a certain range of the relationship between the vacuum at the suction connection path and the atmospheric pressure at the atmosphere connecting path and is connected with a valve body by which the switching of the valve takes place between the two positions (I and II). A throttling restriction is provided in the atmosphere connecting path of the valve.

Additionally, the additional flow control device of the valve is constructed as a narrowing of a round cross-section with a clear diameter of between 0.5 and 1.0 mm, preferably 0.8 mm, while the first flow control device has a clear diameter of between 0.8 and 1.2 mm, preferably 1.0 mm. In such a design, the additional flow control device can be integrated into the valve body. The valve should have an adjustable switching threshold in the vacuum valve range set between 0.7 and 0.4 bar, preferably at 0.5 bar. The valve should be arranged between the first flow control device and the secondary consuming device.

Special constructions of check valves combined with flow control devices are known in the vacuum supply systems of the above-mentioned types. However, in these, a flow control device becomes operative only when the check valve is opened against its restoring force. German Unexamined Patent Application DE-OS 28 14 384 describes a check valve having a flow control device which is integrated and fluidly is arranged in parallel.

By providing the check valve connected between the vacuum generating device and the consuming device(s) with a relatively strong return spring, it is ensured that the secondary consuming devices and the relatively wide flow control device, which is connected behind it (in parallel to the narrow bypass flow control device) will not be evacuated by means of this check valve before a required vacuum level is reached at the brake power assist unit. The priority of the supply of the brake power assist unit continues to be ensured, because as soon as its vacuum chamber is bled during braking operations, the (absolute) pressure in the suction pipe will rise, and the second check valve will close. A slight increase of the achievable (absolute) vacuum level as a result of the bypass pipe, while the consuming device output remains the same, can be accepted without any difficulties.

Another advantageous development for even more reliably ensuring the priority of the brake power assist unit from the vacuum supply system is achieved, if the second check valve, during each braking operation, can be power actuated by any of electrical, hydraulic or pneumatic means.

A check valve in a vacuum supply system for a brake power assist unit which can be power operated is known from German Patent DE-AS 11 20 293. In addition to being operated by pressure differences, it is also controlled by an electric switch coupled with the brake pedal. It is opened electromagnetically and connects the brake power assist unit with a vacuum compensating tank, in order to improve the vacuum level acting upon it.

According to another embodiment of the invention (shown in FIG. 4), a valve is arranged in a secondary pipe between the vacuum generating device and the at least one secondary consuming device and can be controlled as a function of the instantaneously existing vacuum and can be switched into at least two positions.

The secondary pipe either starts out directly from the vacuum generating device, or from its own suction connection (dual-flow system); or leads only indirectly to the secondary consuming device (single-flow system); i.e., leading away as a branch pipe, in front of the check valve, from the main pipe leading to the brake power assist unit.

The overall throttling of the secondary consuming device suction flow is varied, in that in one position of the valve an additional flow control device can be connected in series with the already existing flow control device. In the other valve position, no additional throttling takes place. The valve switches over with a given vacuum value range, i.e., at approximately 0.5 bar. Above this range (in the direction of the atmospheric pressure), the suction flow is throttled more, in order to continue to evacuate the brake power assist unit as a priority. Below this range, the vacuum level existing in the system is sufficient for a reliable operation of the brake power assist unit, so that the throttling of the secondary consuming device suction flow may be reduced without any loss of reliability, and thus the supply of the secondary consuming devices may be improved.

With respect to their basic principles, valve arrangements which allow a variable throttling of flows are known. German Unexamined Patent Application DE-OS 30 11 360 shows a compressed air system for a vehicle, which has a 3/2-way valve, which pneumatically can be switched into two positions and to two corresponding pipe sections. In one position, this 3/2-way valve switches a freely passable pipe section into a compressed air pipe and in the other position, switches a pipe section equipped with a control device into a compressed air pipe. By this arrangement, the amount of air is reduced which must be released by a pressure regulator connected behind the valve since the system pressure behind the valve, or in the pressure regulator, switches it, starting from a certain sufficient pressure level into a "throttling" position. In addition, from German Patent DE-PS 35 26 763, a similar arrangement of an electromagnetically switchable 3/2-way valve is known which, as a function of an electrically detected system pressure, switches either a throttled or an unthrottled pipe section between a bi-pressure pump and consuming devices. This arrangement has the purpose of making it possible to connect several consuming devices with different pressure level requirements to a single pressure source. However, neither of the latter texts supplies any reference to the endeavored improvement referenced in this invention.

Other objects, advantages and novel features of the present invention will become apparent from the following detailed description of the invention when considered in conjunction with the accompanying drawings.

BRIEF DESCRIPTION OF THE DRAWINGS

FIG. 1 is a vacuum supply system having a vacuum generating device, which has a single suction connection;

FIG. 2 is a system having a vacuum generating device, which has two suction connections;

FIGS. 3a and 3b are variants for the control of the external power for shutting the second check valve;

DETAILED DESCRIPTION OF THE DRAWINGS

Figure 4:
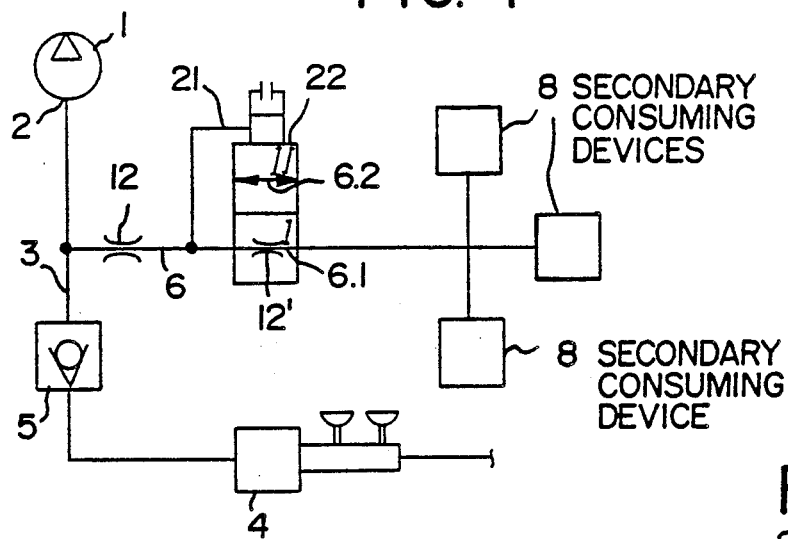
FIG. 4 is another embodiment having a valve, which switches over pneumatically as a function of the vacuum existing in the vacuum supply system; this valve in one position, permitting the passage of a throttled suction flow and, in another position, permitting the passage of an unthrottled suction flow.

In a so-called single-flow vacuum supply system (FIG. 1), a vacuum generating device 1, such as a mechanically driven pump, has a single suction connection 2, to which a main pipe 3 is connected, which is also called a Master-Vac pipe, and which leads to a symbolically indicated vacuum brake power assist unit 4. A first check valve 5 is inserted into the main pipe 3 which only permits the evacuating of the brake power assist unit vacuum chamber and opens up when acted upon by the vacuum generating device 1 even by a low vacuum.

Viewed from the direction of the vacuum generating device 1, a branch pipe 6 leads into the main pipe 3 in front of the first check valve 5. This branch pipe 6 first leads to a first pipe connection 7.1 of a housing 7, and from a second pipe connection 7.2, to one or several schematically indicated additional vacuum consuming devices 8. These may be, for example, the flap adjusting elements of an air-conditioning system or headlight adjusting motors, which, when necessary, are acted upon by a vacuum bY means of switchable valves, which are not shown.

In the housing 7, between the two pipe connections 7.1. and 7.2, are a second check valve 9 and a first flow control device 10, which are fluidly connected in series and a bypass pipe 11 with a second flow control device 12 in parallel to the second check valve 9 and to the first flow control device 10.

The second check valve 9 is held shut by means of a significantly higher restoring force (indicated by a symbol of a spring) than the first check valve 5. It does not open up before an absolute vacuum value of approximately 0.4 bar is reached on the suction side. Nevertheless, a constant, although limited, supply of the additional consuming devices 8 with the vacuum is ensured by the second flow control device 12 in the bypass pipe 11, which preferably is opened up by 0.8 mm with respect to its diameter.

FIG. 2 shows a so-called dual-flow system, in which a vacuum pump 1' is used, which has two separate suction connections 2.1 and 2.2. Again, the main pipe 3 is connected to the first suction connection 2.1, while a bypass pipe 11' having the second flow control device 12 is connected to the second suction connection 2.2.

The two check valves 5, 9, the first flow control device 10 and the junction of the branch pipe 6 and the main pipe 3, in the embodiment according to FIG. 2, are installed in a common housing 13. Toward the outside, this housing 13 has two connections for the main pipe 3 and one connection for the branch pipe 6. The provided arrangement reduces leakage risks resulting from defective pipe connections at check valves or branchings, as at the housing 7 in FIG. 1.

The bypass pipe 11' and the branch pipe 6 are guided together outside the housing 13 in front of the consuming devices 8, in which case a vacuum pressure compensating tank 14 may also be connected to the bypass pipe 11'.

FIGS. 3a and 3b finally show two variants for the shutting of a second check valve 9' by means of an outside power, when the power brake is actuated. In both cases, it must be possible to shut the check valve 9' electromagnetically by means of the indicated winding 15. In FIG. 3a, a mechanically closable switch 17, which is coupled with a brake pedal 16, is used as the trigger for the electromagnetically caused shutting movement. In FIG. 3b, an alternative switch 19 is shown, which can be actuated by pressure and is arranged in the hydraulic or pneumatic brake pipe system 18 of the motor vehicle.

The triggering function for the valve shutting movement may advantageously be assigned as an additional function of the normal vehicle stop light switch, which is part of any motor vehicle. This is shown by a lamp 20, (FIG. 3b) and is connected in parallel to the pressure switch 19.

FIG. 4 shows another possibility which requires neither a continuously open bypass pipe nor a check valve in the secondary consuming device branch. In principle, this solution is again suitable for a single-flow system as well as for a dual-flow system, but is shown only for the former. For this reason, the "secondary pipe" here is a branch pipe of the main pipe. The branch pipe 6 now contains, between the already existing flow control device 12 and the secondary consuming devices 8, a parallel arrangement of a section 6.1, that is provided with an additional flow control device 12', and of a freely passable section 6.2. A valve 22, which can be switched pneumatically by means of a control connection 21, switches a connection between the vacuum generating device 1 and the secondary consuming devices 8 either by means of section 6.1 (Position I) or by means of Section 6.2 (Position II). The control connection 21 is also connected to the branch pipe 6 behind the flow control device 12. The pneumatic drive of the valve 22 is adjusted such that it holds the valve 22, in the case of a vacuum between 1 and approximately 0.5 bar in the branch pipe 6 in its position I, in which, because of the adding up of two flow control resistances 12 and 12', only a very significantly throttled suction flow is possible, and switches it to its position II, below a vacuum of approximately 0.5 bar, in which no significant additional throttling effect over that of resistance 12 exists. The setting of the switching threshold of the valve 22 may take place, for example, by a spring prestressing of the valve, which is variable in a known manner, by a fixed installation of springs having different characteristic curves, according to the requirements, or by other measures.

A type of construction of the integration of sections 6.1 and 6.2 into the valve 22, which is shown here symbolically, will be described in FIG. 6.

Naturally, in the arrangement according to FIG. 4, an electromagnetically switchable valve may replace the shown pneumatically switchable valve 22. This equivalent valve would then be controlled by means of a pressure switch, which would replace the branch pipe, to which the valve control connection 21 is connected in FIG. 4.

With both arrangements, the vacuum supply of the brake power assist unit will then have high priority precisely when the vacuum level in the system is not as low as required in the normal operation. This happens particularly when the motor vehicle is to be started after it has been switched off for a long time, or when the power brake is used intensively, for example, during so-called "cadence braking".

Figure 5:
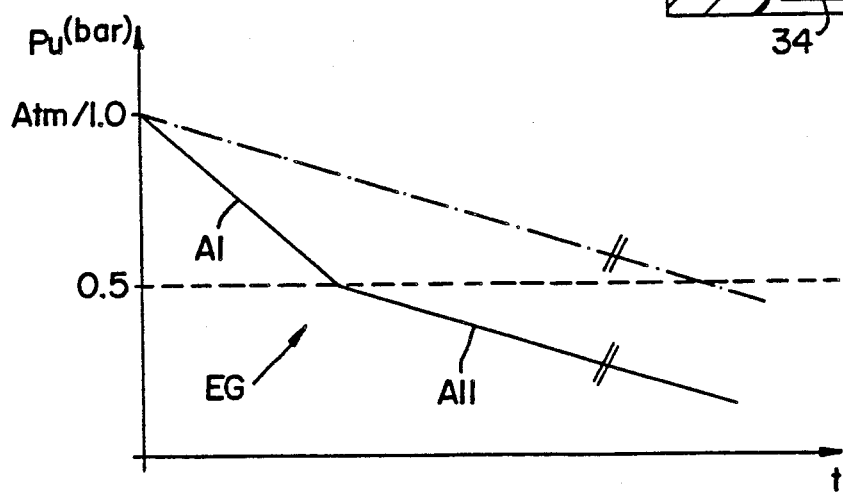
FIG. 5 is a diagram, which shows the effect of the switchable valve on the pressure reduction at the brake power assist unit entered over a timing axis.

The graph of FIG. 5 shows a line EG (evacuating speed), which starts from the atmospheric pressure level (1.0 bar) and which qualitatively represents the pressure course $p_u$ at the brake power assist unit over time t. It shows the effect of the flow control device 12', which can be connected by means of the valve 22. Line EG is composed of two differently steep segments AI and AII, which continuously merge with one another at a bending point. The bending point marks the switching point of the valve 22, which, in this case, is situated at the preferable value of 0.5 bar. A steeper ascent (AI) and thus a higher evacuating speed at the brake power assist unit 4 occurs when the valve is in position I (i.e., when flow control device 12' is effectively connected in series with flow control device 12, and their resistances are added up). In position II of the valve (when flow control device 12' is inoperative), the evacuating speed of the brake power assist unit 4 is lower, which means that the suction performance of the vacuum generating device 1 at the secondary consuming devices 8 is better. However, as soon as a pressure rise exists in the system, which exceeds the switching point of valve 22, the flow control device 12' is switched back to be operative, since the valve 22 returns to its (inoperative) position I and the suction performance of the vacuum generating device 1 at the brake power assist unit 4 is increased correspondingly.

Since the vacuum in the normal operation is clearly below 0.5 bar, switching processes of the valve 22 are expected only when the power brake operated with unusual intensity.

A dash-dotted line with the same ascent as segment AII of Line EG indicates that the desirable vacuum level at the brake power assist unit, without flow control device 12', which can also be switched, would be reached significantly later while the supply of the secondary consuming devices is approximately equally good.

Figure 6:
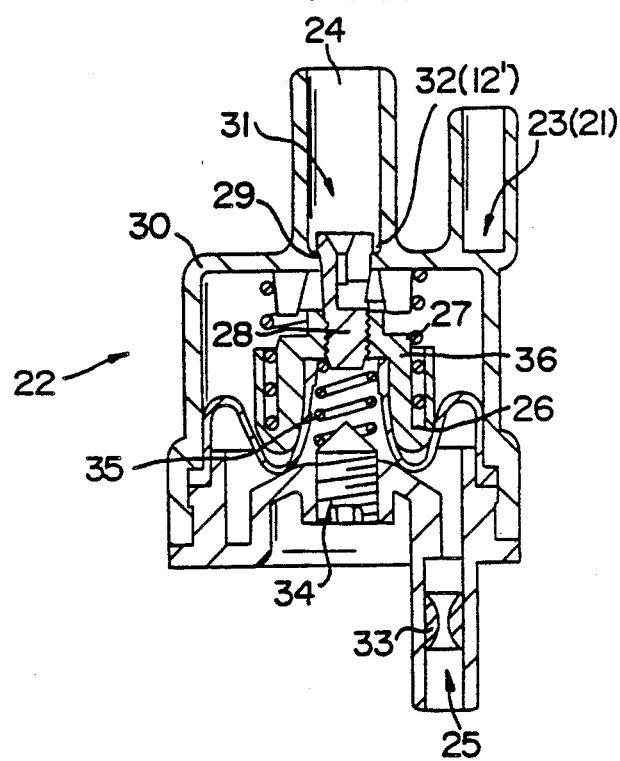
FIG. 6 is an embodiment of a pneumatically switchable valve, which can be used advantageously in the vacuum supply system according to FIG. 4.

FIG. 6 finally is a sectional view of an embodiment of a pneumatically switchable valve 22. Valve 22 has a suction connection path 23, a consuming device connecting path 24 and an atmosphere connecting path 25. The latter is permanently separated from the two other paths of the valve 22 by means of an elastic diaphragm 26. The diaphragm 26 is prestressed to a position I by a prestressing spring 27 and has both its sides exposed to a pressure difference. The diaphragm 26 is firmly connected with a valve body 28, which cooperates with valve seat 29 of the valve chamber 30. In position I, the valve body 28 is located on the valve seat 29. A connection will then exist between the suction connection path 23 and the consuming device connecting path 24 only through a center bore 31 in the valve body 28, which has a restricted narrow point 32, acting as the flow control device 12'. When the differential pressure at the diaphragm 26, resulting from atmospheric pressure at connecting path 25 and vacuum at connecting path 23, outbalances the prestressing force of the spring 27, (i.e., the system vacuum has reached the required level), the diaphragm 26 in the housing 30 is shifted in the direction of the consuming device connecting path 24 and lifts the valve body 28 off its seat 29. As a result, an annular-gap-shaped flow cross-section is exposed which is significantly larger than the restricted narrow point 32 in the valve body. The suction connection path 23 in addition therefore takes over the function of the control input 21, which is shown in FIG. 4.

In addition, a flow control point 33 is provided in the atmosphere connecting path 25, which is used only as a simple additional safety device against an unhindered penetration of atmospheric pressure into the vacuum system in the case of possibly occurring defects or leakages of the diaphragm 26.

The switching threshold of the valve 22 can be adjusted to desired values in a simple manner by an adjusting screw 34 in the valve chamber 30. The adjusting screw sets the bias of an inserted spring 35, in a supporting body 36 of the diaphragm, which firmly connects the valve body 28 with the diaphragm 26.

Although the present invention has been described and illustrated in detail, it is to be clearly understood that the same is by waY of illustration and example only, and is not to be taken by way of limitation. The spirit and scope of the present invention are to be limited only by the terms of the appended claims.

What is claimed:

1. A vacuum supply system for a brake power assist unit in a motor vehicle, as well as for at least one secondary vacuum consuming device comprising:
   a vacuum generating device;
   a main pipe being provided between a suction connection of the vacuum generating device and the brake power assist unit and having a first check valve therein;
   a secondary pipe which leads from the vacuum generating device to the at least one secondary consuming device;
   the secondary pipe containing at least one first flow throttle for throttling suction flow from the secondary consuming device to the vacuum generating device;
   a valve means for controlling the suction flow through the secondary pipe;
   the valve means being switchable between two positions as a function of vacuum instantaneously existing in the system said suction flow being controlled in a first position of said valve means by an additional flow throttle that is connected in series with the first flow throttle by the valve means, and in a second position of the valve mans, only by the first flow throttle.

2. A vacuum supply system according to claim 1, wherein the valve means can be pneumatically and directly switched within a certain vacuum value range by the vacuum existing in the system.

3. A vacuum supply system according to claim 1, wherein the valve means can be switched electromagnetically and in a controlled manner by an electric pressure responsive switch which responds to vacuum existing in the system within a certain vacuum value range.

4. A vacuum supply system according to claim 2, wherein the valve means is constructed as a 2 position/2 way valve.

5. A vacuum supply system according to claim 3, wherein the valve means is constructed as a 2 position/2 way valve.

6. A vacuum supply system according to claim 2, wherein the valve means is located in a chamber that has a suction connection path, a consuming device connecting path, and an atmosphere connecting path;
   both the suction connection path and the consuming device connecting path are constantly separated from the atmosphere connecting path by a diaphragm;

the diaphragm being switched within the certain vacuum valve range in response to difference between vacuum at the suction connection path and atmospheric pressure at the atmosphere connecting path; and wherein a valve body is connected with the diaphragm for causing a switching between the two positions.

7. A vacuum supply system according to claim 6, wherein a throttling restriction is provided in the atmosphere connecting path.

8. A vacuum supply system according to claim 1, wherein the additional flow throttle is constructed as a narrowing of a cross-section diameter path in the valve means which has a clear diameter of between 0.5 and 1.0 mm and in that the first flow control device has a corresponding clear diameter of between 0.8 and 1.2 mm.

9. A vacuum supply system according to claim 5, wherein the additional flow throttle is integrated into the valve body.

10. A vacuum supply system according to claim 6, wherein the additional flow throttle is integrated into the valve body.

11. A vacuum supply system according to claim 7, wherein the additional flow throttle is integrated into the valve body.

12. A vacuum supply system according to claim 1, wherein the valve means has an adjustable switching threshold.

13. A vacuum supply system according to claim 6, wherein the valve means has an adjustable switching threshold.

14. A vacuum supply system according to claim 7, wherein the valve means has an adjustable switching threshold.

15. A vacuum supply system according to claim 12, wherein the adjustable switching threshold of the valve means is set in the vacuum value range between 0.7 and 0.4 bar.

16. A vacuum supply system according to claim 13, wherein the adjustable switching threshold of the valve means is set in the vacuum value range between 0.7 and 0.4 bar.

17. A vacuum supply system according to claim 14, wherein the adjustable switching threshold of the valve means is set in the vacuum value range between 0.7 and 0.4 bar.

18. A vacuum supply system according to claim 1, wherein the valve means is arranged between the first flow throttle and the at least one consuming device.

* * * * *